United States Patent [19]

Svoboda

[11] 4,098,101
[45] Jul. 4, 1978

[54] LATCH MECHANISM FOR DOORS AND THE LIKE

[75] Inventor: James Svoboda, Yorkville, Ill.

[73] Assignee: Caterpillar Tractor Co., Peoria, Ill.

[21] Appl. No.: 729,525

[22] Filed: Oct. 4, 1976

[51] Int. Cl.² .................................................. E05B 65/06
[52] U.S. Cl. ......................................... 70/134; 70/150;
  70/208; 292/143; 292/147; 292/DIG. 31
[58] Field of Search ................ 70/134, 129, 141, 150,
  70/208; 292/143, 147, DIG. 31, 40, 137–139,
  161, 173, 152, 190, DIG. 73

[56] References Cited

U.S. PATENT DOCUMENTS

| 847,751 | 3/1907 | Faix ........................... 292/147 X |
| 1,035,073 | 8/1912 | Augenbraun ............ 292/DIG. 31 X |
| 2,900,204 | 8/1959 | Pelcin ........................ 70/150 X |
| 3,560,731 | 2/1971 | Burton ...................... 292/147 X |
| 3,649,060 | 3/1972 | Ruff ........................... 292/147 X |
| 3,707,862 | 1/1973 | Pastva, Jr. ........... 292/DIG. 31 X |
| 3,806,175 | 4/1974 | Van Herpen ................ 292/147 |
| 3,871,198 | 3/1975 | Miller ....................... 70/208 X |

FOREIGN PATENT DOCUMENTS

| 196,740 | 3/1958 | Austria ................................. 292/161 |
| 483,411 | 4/1917 | France ................................. 292/147 |

*Primary Examiner*—Roy D. Frazier
*Assistant Examiner*—William E. Lyddane
*Attorney, Agent, or Firm*—Phillips, Moore, Weissenberger, Lempio & Strabala

[57] ABSTRACT

A latch mechanism is mounted on a door or panel hingedly mounted on the frame of a construction vehicle or the like. The latch mechanism comprises a handle pivotally mounted in exposed relationship on an upper side of the door for movement between latched and unlatched positions thereon. A guide block is secured to an underside of the door and a latch member is slidably mounted in the guide block. The latch member is connected to the handle for sliding movements between a latched position underlying a stationary panel of the vehicle and an unlatched position whereby the door may be opened in response to raising of the handle. Detent means are provided between the guide block and the latch member to hold the member in its unlatched position when the door is open. A key lock may be mounted on the door to selectively hold the latch member plate in its latched position.

10 Claims, 3 Drawing Figures

LATCH MECHANISM FOR DOORS AND THE LIKE

BACKGROUND OF THE INVENTION

Construction vehicles, such as tractors, excavators and the like, comprise a plurality of openable doors or panels to provide access to operating components of the vehicle, such as batteries. Conventional latching mechanisms are normally employed to selectively latch the door in a closed position on a panel of the vehicle. Such mechanisms normally comprise a spring-loaded latch which is adapted to engage a striker plate upon closing of the door. The mechanisms are somewhat extensive to manufacture and are prone to undue wear and damage.

SUMMARY OF THIS INVENTION

An object of this invention is to provide an improved latch mechanism which is non-complex in construction and exhibits a high degree of structural integrity. The latch mechanism comprises handle means movably mounted on an upper side of a first member or door for movement between latched and unlatched positions thereon. A guide means is secured to an underside of the first member and a latch member is slidably mounted thereon. The latch member is connected to the handle for sliding movements between a latched position underlying a stationary second member and an unlatched position whereby the first member may be opened. Detent means are provided between the guide means and the latch member for releasably holding the member in its unlatched position. If so desired, a key lock may be mounted adjacent to an end of the latch member to lock it in its latched position.

BRIEF DESCRIPTION OF THE DRAWING

Other objects of this invention will become apparent from the following description and accompanying drawing wherein.

DETAILED DESCRIPTION

Figure 1:
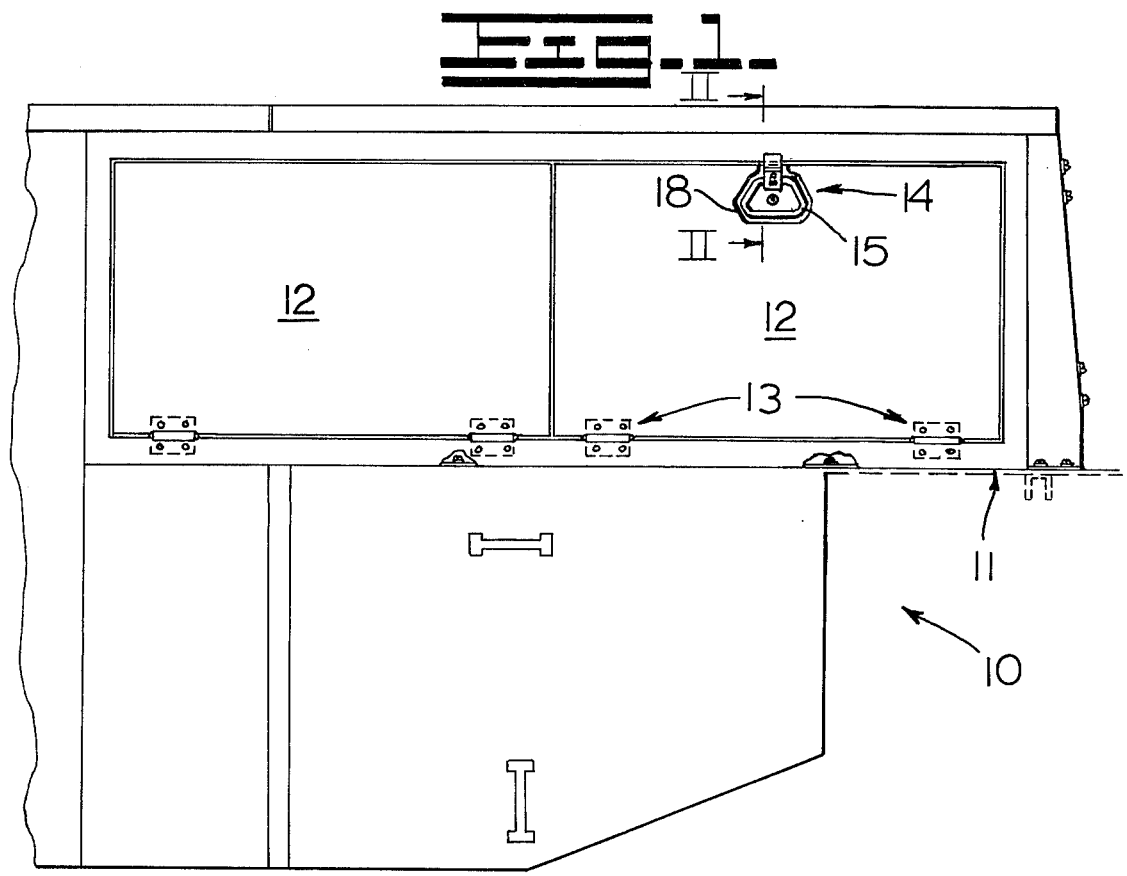
FIG. 1 is a partial top plan view of a portion of a construction vehicle having a latch mechanism of this invention employed thereon.

FIG. 1 partially illustrates a mobile construction vehicle 10, such as a tractor or the like, comprising a frame structure 11 having a plurality of panels or doors 12 hingedly mounted thereon at 13. The doors may be employed to house and protect components of the vehicle, such as batteries and the like. A latch mechanism 14 of this invention is shown mounted on one of the doors and comprises a handle means 15 mounted exteriorly on the door. The handle means is adapted to be moved between its solid-line latched position, illustrated in FIGS. 1 and 2, and its phantom-line unlatched position 15', illustrated in FIG. 2.

The handle means is pivotally mounted on an outer side of door 12 by a bent strap 16 overlying the handle means. The strap has opposite ends thereof secured by welds or the like to a stamped dish-shaped plate 17 which defines a recess 18 to accommodate the handle means therein when it is disposed in its latched position illustrated. Plate 17 is disposed over an opening 19 which accommodates recess 18 thereof and may be suitably welded or otherwise suitably secured to the outer side of door 12. Thus, latch mechanism 14 and plate 17 constitute a sub-assembly which may be readily installed on door 12 during fabrication and assembly of the vehicle.

The latch mechanism further comprises a guide means 20 which may be in the form of a single block 21 having a pair of laterally spaced and elongated tracks 22 formed internally thereon. The tracks slidably receive lateral edges of a latch member 23 which may be suitably stamped out of a metallic plate and which is connected to handle means 15 for simultaneous movement therewith. In particular, a central extension 24 of the handle means extends between a pair of lugs 25 which define an opening 26 through the latch member for receiving the lower extremity of handle extension 24.

Figure 2:
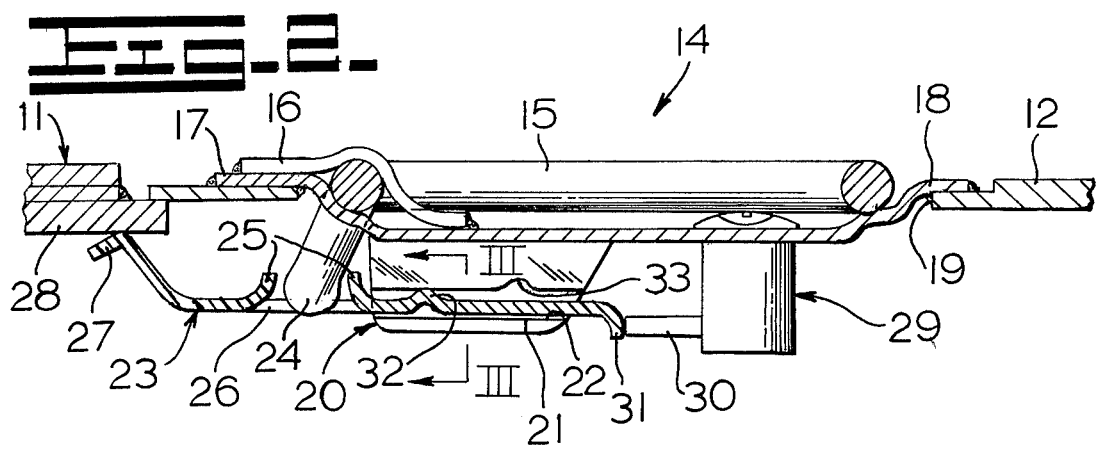
FIG. 2 is an enlarged sectional view of the latch mechanism, taken in the direction of arrows II—II in FIG. 1.
Figure 3:
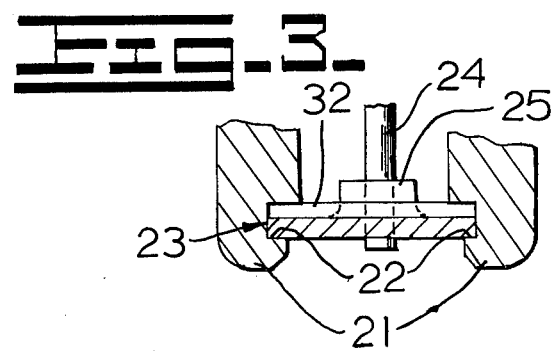
FIG. 3 is a slightly enlarged sectional view of a portion of the latch mechanism, taken in the direction of arrows III—III in FIG. 2.

When the latch member is moved fully leftwardly by the handle means, as viewed in FIG. 2, a bent spring portion 27 of the latch member engages beneath a stationary plate or panel 28 which forms an integral part of vehicle frame 11. Thus, door 12 cannot be opened. In order to lock handle means 15 and latch member 23 in their latched positions, a standard rotary key lock 29 may be suitably mounted on plate 17 to have a lug 30 thereof closely oppose a bent end 31 of the latch member, i.e., insertion and the turning of a key in lock 29 is adapted to rotate lug 30 ninety degrees between its locked and unlocked positions.

Assuming that key lock 29 has been actuated to turn lug 30 ninety degrees to its unlocked position, raising of handle 15 will move plate means 23 rightwardly in FIG. 2. Thus, bent portion 27 of the latch member will disengage from under plate 28 to permit door 12 to be lifted and pivoted about hinges 13 to its opened position (FIG. 1). In order to releasably hold latch member 23 in its unlatched condition of operation, a detent means comprising a detent 32 formed on the latch member and accommodating recesses 33 formed in tracks 22 of guide means 20 is provided. It should be understood that the latch member is preferably constructed out of a thin steel plate or the like which exhibits sufficient flexibility and resiliency to permit detent 32 to deflect into recesses 33.

What is claimed is:

1. A latch mechanism mounted on a first member movably mounted on a second member comprising handle means movably mounted on an outer side of said first member for movement between latched and unlatched positions thereon, guide means secured to an underside of said first member, and a latch member comprising a resilient spring-like member slidably mounted on said guide means and connected to said handle for sliding movements between said latched position underlying an inner side of said second member and said unlatched position in response to movement of said handle means, said latch member including a bent spring portion formed unitarily therewith to function as a spring for biasing said latch member against said inner side of said second member when the latch member is in said latched position, said spring-like latch member further including a detent portion formed unitarily thereon, said guide means including a recess defined therein positioned to accommodate said detent portion, said detent portion resiliently deflecting into said recess to thereby releasably hold said latch member in said unlatched position thereof.

2. The latch member of claim 1 wherein said first member constitutes a door hingedly mounted on a mobile vehicle.

3. The latch member of claim 1 wherein said handle means is pivotally mounted on said first member.

4. The latch member of claim 3 wherein said handle is pivotally mounted on said first member by a bent strap overlying said handle means and having opposite ends thereof secured to said first member.

5. The latch member of claim 4 wherein said strap is secured to a plate, secured to the outer side of said first member.

6. The latch member of claim 5 wherein said plate is dish-shaped to accommodate said handle means therein when it is disposed in its latched position.

7. The latch member of claim 1 wherein said guide means comprises at least one block member having a pair of laterally spaced and elongated tracks formed thereon, lateral edges of said latch member slidably mounted in said tracks.

8. The latch member of claim 1 wherein said handle means is connected to said latch member by an extension formed on said handle means which extends between a pair of lugs formed on said latch member to define an opening receiving the extension of said handle means therein.

9. The latch member of claim 7 wherein said accommodating recess comprises a recess formed in at least one of the tracks formed in said block member.

10. The latch member of claim 1 further comprising a rotary key lock mounted on said first member and having a lug thereof rotatably mounted between a locked position opposing an end of said latch member and an unlocked position.

* * * * *